United States Patent
Taniguchi et al.

(10) Patent No.: US 8,110,309 B2
(45) Date of Patent: Feb. 7, 2012

(54) SECONDARY BATTERY

(75) Inventors: Yasutomo Taniguchi, Moriguchi (JP); Yoshiyuki Furukouji, Moriguchi (JP); Yasuhiro Yamauchi, Moriguchi (JP); Toshiyuki Nohma, Moriguchi (JP)

(73) Assignee: SANYO Electric Co., Ltd., Moriguchi-shi, Osaka (JP)

( * ) Notice: Subject to any disclaimer, the term of this patent is extended or adjusted under 35 U.S.C. 154(b) by 358 days.

(21) Appl. No.: 12/398,374

(22) Filed: Mar. 5, 2009

(65) Prior Publication Data

US 2009/0246637 A1 Oct. 1, 2009

(30) Foreign Application Priority Data

Mar. 31, 2008 (JP) ................. 2008-089570

(51) Int. Cl.
*H01M 2/14* (2006.01)
(52) U.S. Cl. ...................... 429/246; 209/247
(58) Field of Classification Search .............. 429/246, 429/247, 209
See application file for complete search history.

(56) References Cited

U.S. PATENT DOCUMENTS

2009/0111011 A1* 4/2009 Kim et al. ............ 429/133

FOREIGN PATENT DOCUMENTS

| JP | 09-134719 A | 5/1997 |
| JP | 2000-188115 A | 7/2000 |
| JP | 2001-076758 A | 3/2001 |
| JP | 2006-128106 A | 5/2006 |

* cited by examiner

*Primary Examiner* — Jane Rhee
(74) *Attorney, Agent, or Firm* — Westerman, Hattori, Daniels & Adrian, LLP

(57) ABSTRACT

The invention provides a secondary battery having positive electrode plates 14 and negative electrode plates, with insulating tapes 22A, 22B affixed to the cut end portions 14d, including an active material layer 14b portion thereof, of either the positive electrode plates 14 or the negative electrode plates, or both. These electrode plates are stacked or rolled alternately, with separators 23 interposed, into an electrode group that is sealed, together with electrolyte, inside a battery case. The insulating tapes 22A, 22B have an adhesive application area $L_2$ and a nonadhesive application area $L_1$, and are affixed in such a manner that the nonadhesive application area $L_1$ is positioned centrally on the active material layer 14b of the electrode plate 14, and moreover so that part of the adhesive application area $L_2$ is positioned on the active material layer 14b at the cut end portion 14d.

18 Claims, 7 Drawing Sheets

SECONDARY BATTERY

TECHNICAL FIELD

The present invention relates to a secondary battery, and more particularly to a secondary battery having an electrode plate whose end portions are protected by being covered with insulating tape.

BACKGROUND ART

In various types of electronic equipment, such as mobile terminals, typified by mobile telephones, a wide diversity of types of batteries are used as the power source. In addition, the strengthening of regulations on emissions of carbon dioxide gas and so forth against a background of increasingly vigorous movements for environmental protection in recent years has seen the automobile industry engaging energetically in development of electric vehicles (EVs) and hybrid electric vehicles (HEVs) as well as vehicles using fossil fuels such as gasoline, diesel oil, and natural gas. Furthermore, the steep rise in the price of fossil fuels in recent times has acted as an engine driving forward the development of these EVs and HEVs.

Well-known secondary batteries used for such applications are nonaqueous electrolyte secondary batteries typified by the lithium ion battery, alkali storage batteries typified by nickel-hydrogen batteries, and the like. Among them, the range of applications of nonaqueous electrolyte secondary batteries typified by the lithium ion battery is expanding due to their superior characteristics, examples of which are high actuation voltage (3V or higher) and high theoretical energy density compared to aqueous electrolyte batteries, along with low self-discharge, and furthermore a wide operating temperature range and excellent liquid leakage resistance.

Such secondary batteries are composed of, for example, a rolled electrode group including positive electrode plates and negative electrode plates that are rolled, with separators interposed, into a flattened form; a prismatic battery case that is of a size such as to house the rolled electrode group and a particular quantity of electrolyte, and that is open at the top; and a sealing body which is inserted into the open top of the prismatic battery case, thereby sealing such opening, and on which there are formed a positive electrode terminal and a negative electrode terminal. To assemble such a battery, first of all the flattened-form rolled electrode group is placed inside the prismatic battery case, then the collectors of the positive electrode plates and the negative electrode plates are welded to the positive electrode terminal and the negative electrode terminal respectively. Next, the sealing body is welded to the opening of the battery case, and electrolyte is poured in through a pour hole provided in the sealing body. Finally, the pour hole is sealed.

With such batteries however, short circuits may occur in the interior due to some cause or other. When such internal short circuits occur, they can not only result in product failure, but also induce bursting or ignition accidents. Nonaqueous electrolyte secondary batteries, typified by the lithium ion battery, are particularly prone to burst or ignite because they have high capacity and output characteristics, so that if internal short-circuits occur, chemical reactions may take place between the electrode body and nonaqueous electrolyte contained in the battery, resulting in abnormal pressure rise in the battery interior. Accordingly, for such batteries, technology has been put forward that prevents short circuits by affixing insulating tape at the locations where internal short-circuits are prone to occur (see for example JP-A-2000-188115 (paragraphs [0006] to [0007], FIGS. 3 and 9), JP-A-2006-128106 (paragraph [0008], FIGS. 2 and 3), JP-A-9-134719 (paragraph [0009], FIGS. 2 and 3), and JP-A-2001-76758 (paragraphs [0010] and [0011], FIG. 2)).

The battery short-circuit prevention technology disclosed in JP-A-2000-188115 and JP-A-2006-128106 will now be described, referring to FIGS. 6 and 7. FIG. 6A is a plain view of the electrode material end portion disclosed in JP-A-2000-188115, FIG. 6B is a cross-sectional view along line VIB-VIB in FIG. 6A, and FIG. 6C is a longitudinal cross-sectional view of the electrode material end portion given as an example of the related art in JP-A-2000-188115. FIG. 7A is a plain view of the electrode plate disclosed in JP-A-2006-128106, and FIG. 7B is a cross-sectional view along line VIIB-VIIB in FIG. 7A.

An electrode material end portion 50 disclosed in JP-A-2000-188115 is an improvement of an electrode material end portion 50A of the related art (see FIG. 6C). As FIGS. 6A and 6B show, in this electrode material end portion 50 there is formed an area 51a where an electrode active material layer 52 formed on an electrode collector 51 is removed, and by affixing resin tape 53 to this area 51a, a thickness $H_1$ of the portion where the resin tape 53 is provided is rendered almost equal to a thickness $H_2$ of the portion where the electrode active material layer 52 is formed.

With such configuration, the level difference between the portion where the resin tape 53 is formed and the portion where the electrode active material layer 52 is formed disappears, as is plain from a comparison with the electrode material end portion 50A shown in FIG. 6C. This means that with the invention disclosed in JP-A-2000-188115, the resin tape 53 yields the effect of preventing electrical short-circuits due to burr produced when the electrode material is cut, or to the level-difference portions, which arise between the end portions of the positive and negative electrodes on the one hand, and the electrode terminals on the other, when the latter are welded to the former, piercing through the thin gel-like electrolyte layer and touching the other electrode.

Also, in an electrode plate 54 disclosed in JP-A-2006-128106, protrusions a and a' formed at the application start edge and application finish edge when an active material 56 is applied to the surface of an electrode material 55 are covered with insulating members 57, as FIGS. 7A and 7B show. The base members of these insulating members 57 are formed from a porous electrolyte-permeable material. Also, a collection tab 58 is provided in the region of the electrode plate 54 where the active material 56 is not applied.

Thus, thanks to the protrusions a and a', which rise at the application start edge and application finish edge of the active material 56, being covered by the insulating members 57, damage to the separators due to contacting of the positive and negative electrodes with each other and with the protrusions a and a' is prevented. Hence, while electrically insulating the two electrode plates, the insulating members 57 also exert the advantageous effect of preventing occurrence of electrical short-circuits between the two electrode plates, and decrease of the battery capacity, because they are formed from a porous material that facilitates movement of the electrolyte.

Further, also well-known are inventions whereby the application edge portions of the electrode mixture are covered with lithium ion-opaque tape, which suppresses reactions at the portions of the negative electrode that do not oppose the positive electrode, so that the storage characteristics of the nonaqueous electrolyte secondary battery are enhanced (see for example JP-A-9-134719), or whereby one peripheral edge of the positive electrode surface is covered with insulating tape so as to provide a nonaqueous electrolyte secondary battery in which contacting of the burr occurring on the cut surfaces of one electrode plate with the other electrode plate is prevented (see for example JP-A-2001-76758).

Employing an electrode material end portion configuration such as disclosed in the aforementioned JP-A-2000-188115, JP-A-2006-128106, JP-A-9-134719 and JP-A-2001-76758 will essentially yield the advantageous effect of preventing the short-circuits that are liable to occur between the electrodes of the nonaqueous electrolyte secondary battery fabricated.

However, the positive electrode plate and the negative electrode plate are both fabricated using an elongated strip-form electrode sheet, which undergoes a process of cutting to the appropriate electrode length after a layer of positive electrode active material or negative electrode active material, as appropriate, has been applied to the sheet by a predetermined method. There are two methods for application of the active material layer to the elongated electrode sheet. One is to apply just the amount required for formation of one electrode, then leave a substrate-exposed portion where the active material layer is not applied, and to repeat such alternating applications and non-applications of the layer, applying it "intermittently", so to speak (this is termed the "intermittent application method" below). The other method is to apply the layer continuously, positioning the substrate-exposed portion at one of the edges that are orthogonal to the longitudinal direction (this is termed the "continuous application method" below). The substrate-exposed portion is provided in order to fix the collection tab.

When such continuous application method is employed, the active material layer and the collector, which supports the active material layer, are cut simultaneously during cutting of the elongated electrode sheet. Because of this, burr protrusions occur on the cut surfaces of the collector, and also, the cross-section of the active material layer and the regions close to such cross-section are put into an unstable state due to the impacts during cutting, so that the active material layer is prone to slide off. Whereas with the intermittent application method the problem of the active material layer sliding off due to the cutting does not arise, because the cutting is performed at the substrate-exposed portion. Nevertheless, with the intermittent application method protrusions do occur at the application starting portions and application ending portions in application of the active material layer, and it is therefore necessary to affix resin tape, in the manner set forth in JP-A-2006-128106.

In the subsequent assembly process, positive electrode plates and negative electrode plates with active material layers formed by employing the foregoing continuous application method are stacked or rolled together with separators interposed. During such process, there is a risk that the active material layer at the cut surfaces of the positive and negative electrode plates slides off due to impacts and the like, since such active material layer has become prone to slide off. If such active material layer does slide off, the slid active material migrates inside the battery interior after assembly of the battery, causing internal short-circuits. To prevent such sliding-off of the active material layer, a method that suggests itself is to affix adhesive tape to the cut surfaces of the electrode plates, as in the related art disclosed in JP-A-2000-188115 (see FIG. 6C). However when adhesive tape is affixed to the cut surfaces of the electrode plates, the adhesive provided on the tape may absorb electrolyte and cause the electrolyte inside the separators to deplete. Should the electrolyte inside the separators deplete in this way, the positive electrode material sticks out, causing an internal short circuit.

Considered from this aspect, affixing tape to the electrode material end portions with adhesive in an example of related art entails the risk that the adhesive applied to the tape absorbs electrolyte and cause the electrolyte inside the battery to deplete. However, in the inventions disclosed in the aforementioned JP-A-2000-188115, JP-A-2006-128106, JP-A-9-134719 and JP-A-2001-76758, no consideration whatever is given to the problem of depletion of the electrolyte when tape is affixed to the electrode material end portions with adhesive.

For example, with the electrode material end portion 50A of the related art set forth in JP-A-2000-188115 (see FIG. 6C), the adhesive of the resin tape is stuck over the whole surface of the active material, so that there is a risk that the adhesive absorbs electrolyte and deplete the electrolyte inside the separators. On the other hand, the configuration of the electrode material end portion 50 (see FIGS. 6A and 6B), corresponding to the improved invention disclosed in JP-A-2000-188115, represents the case where, after an elongated electrode plate fabricated using the continuous application method has been cut at the portion where the active material layer is present, a substrate-exposed portion is provided by removing the active material layer formed on the substrate, and in this case there is risk that the active material layer slides off because its end portions are not covered with the resin tape. Also, in the case where substrate-exposed portions are provided via the intermittent application method and cutting is then performed at such portions, the active material layer is not cut, and so the problem of the active material layer sliding off, which arises if the active material layer is cut, is absent. Note that the structure of the electrode material end portion of JP-A-2006-128106 is obtained by providing substrate-exposed portions via the intermittent application method, then performing cutting at such portions, so that the active material layer is not cut, and hence with such structure the problem of the active material layer sliding off, which arises if the active material layer is cut, is absent. JP-A-9-134719 and JP-A-2001-76758 also make no mention whatever concerning the sliding-off and migration of the active material that occurs if the active material layer is cut, or concerning depletion of the electrolyte.

SUMMARY

An advantage of some aspects of the present invention is to provide a secondary battery in which the electrode plate end portions are protected by being covered with insulating tape, but the active material does not slide off or migrate, and moreover depletion of the electrolyte is suppressed, and occurrence of electrical short-circuits between the electrode plates, and decrease of the battery capacity, is prevented.

According to an aspect of the invention, a secondary battery includes: a positive electrode plate with a positive electrode active material layer formed on a surface of a positive electrode collector; a negative electrode plate with a negative electrode active material layer formed on a surface of a negative electrode collector; a separator that is interposed between the positive electrode plate and the negative electrode plate; and insulating tape that is affixed to a cut end portion, including an active material layer portion, of either the positive electrode plate, or the negative electrode plates, or both. The electrode plates and the separator being stacked or rolled alternately into an electrode group that is sealed, together with electrolyte, inside a battery case, the insulating tape being constituted of adhesive insulating tape that has an adhesive application area where adhesive has been applied and a nonadhesive application area where adhesive has not been applied, and the insulating tape being affixed so that the nonadhesive application area is positioned centrally on the active material layer of the electrode plate to which the insulating tape is affixed, and moreover so that a part of the adhesive application area is positioned on the active material layer at the cut end portion side.

With the secondary battery according to the present aspect of the invention, the adhesive insulating tape is affixed so that the nonadhesive application area is positioned centrally on the active material layer of the electrode plate to which the insulating tape is affixed, and moreover so that a part of the adhesive application area is positioned on the active material layer at the cut end portion side. Thanks to such affixation of the insulating tape, the adhesive application area contacts against the surface of the active material layer, thereby preventing sliding-off of the active material layer at the cut end portion side. Also, the nonadhesive application area, not being provided with adhesive, does not absorb electrolyte. Because the nonadhesive application area is provided at those portions of the insulating tape edges that are proximate to the separator, absorption by adhesive of the electrolyte inside the separator in the vicinity of the insulating tape edge portions can be prevented. Also, in the state where the electrode group has been formed, it is the area of the insulating tape where adhesive has not been applied that is pressed in the direction of the active material layer, so that the electrolyte is unlikely to reach the adhesive portions, and hence absorption of the electrolyte by the adhesive is suppressed. Further, since the nonadhesive application area is disposed on the active material in the vicinity of the cut end portion, the adhesive application area of the insulating tape that is positioned on the active material layer is narrow even when insulating tape of width similar to that in the related art is used, and therefore the amount of electrolyte that the adhesive absorbs can be kept to a minimum. Hence, with the secondary battery according to the present aspect of the invention, a secondary battery is obtained in which electrical short-circuits between the electrode plates, and decrease of the battery capacity, are suppressed because the active material is unlikely to slide off or migrate, and in which depletion of the electrolyte is suppressed.

The secondary battery according to the present aspect of the invention can be applied both to an electrode group produced by stacking the positive electrode plate and the negative electrode plate alternately with the separator interposed, and to an electrode group produced by rolling such items together alternately. Further, in the case of a rolled electrode group, such configuration can be applied to a cylindrical, or to a conical, or to a flattened-form rolled electrode group.

With the secondary battery according to the present aspect of the invention, it is preferable that the active material layer be formed on both obverse and reverse faces of the positive electrode plate and negative electrode plate, and the insulating tape be affixed on both faces of the cut end portion side, including the cut end portion.

With the secondary battery according to the present aspect of the invention, thanks to the active material layer being formed on both the obverse and reverse faces of the positive electrode plate and negative electrode plate, and the insulating tape being affixed on both faces of the cut end portion side, including the cut end portion, the battery capacity can be raised while yielding the foregoing advantageous effects of the invention. Also, since the insulating tape is affixed so as to cover vicinities that include the cut end portion, sliding-off and migration of the active material can be more effectively suppressed.

With the secondary battery according to the present aspect of the invention, it is also preferable that the insulating tape have at both ends a nonadhesive application area where adhesive is not applied, and that between such nonadhesive application areas, there be provided an adhesive application area where adhesive is applied.

Such insulating tape can be affixed, by being folded double, to both faces of the end portion of an electrode plate, or be affixed unfolded to the end portion of two different electrode plates. With the latter configuration, in particular, affixation is facilitated and manufacturing efficiency enhanced, rendering such configuration optimal for mass production purposes.

With the secondary battery according to the present aspect of the invention, it is preferable that the length of the adhesive application area be 25 to 95% of the total length of the adhesive application areas and the nonadhesive application area that is positioned centrally on the active material layer, that the length of the adhesive application area portion positioned on the active material layer at the cut end portion side be 1.5 mm or higher, and that the length of the adhesive application area portion not positioned on the active material layer at the cut end portion side be 1.5 mm or higher.

With the secondary battery according to the present aspect of the invention, thanks to a length of the adhesive application area being 25 to 95% of a total length of the adhesive application areas and the nonadhesive application area that is positioned centrally on the active material layer, a length of the adhesive application area positioned on the active material layer at the cut end portion side being 1.5 mm or higher, and moreover a length of the adhesive application area not positioned on the active material layer at the cut end portion side being 1.5 mm or higher, it is possible, with various sizes of electrode plate, to eliminate sliding-off and migration of the active material, to keep depletion of the electrolyte to a minimum, and to prevent electrical short-circuits between the electrode plates and decrease of the battery capacity.

BRIEF DESCRIPTION OF THE DRAWINGS

The invention will be described with reference to the accompanying drawings, wherein like numbers reference like elements.

DESCRIPTION OF EXEMPLARY EMBODIMENTS

Exemplary embodiments of the invention will now be described with reference to the accompanying drawings. It should be understood however that the embodiments below are intended by way of examples of prismatic nonaqueous electrolyte secondary batteries as an example of secondary batteries that realize the technical concepts of the invention, and not by way of limiting the invention to these particular prismatic nonaqueous electrolyte secondary batteries. The invention can equally well be adapted to yield other embodiments without departing from the scope and spirit of the appended claims.

Figure 1B:
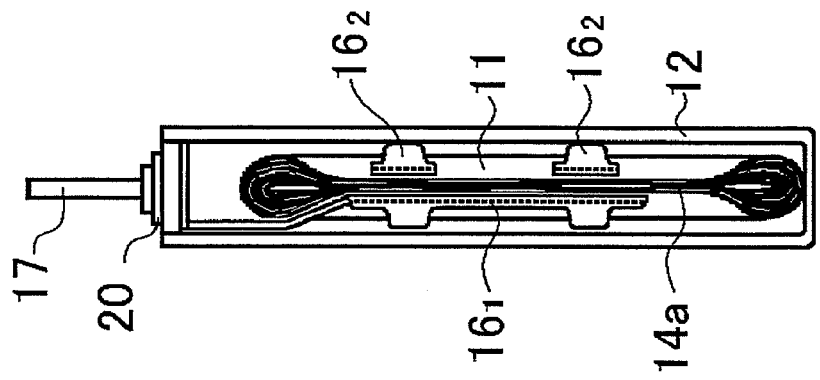
FIG. 1B is a cross-sectional view along line IB-IB in FIG. 1A.
Figure 1A:
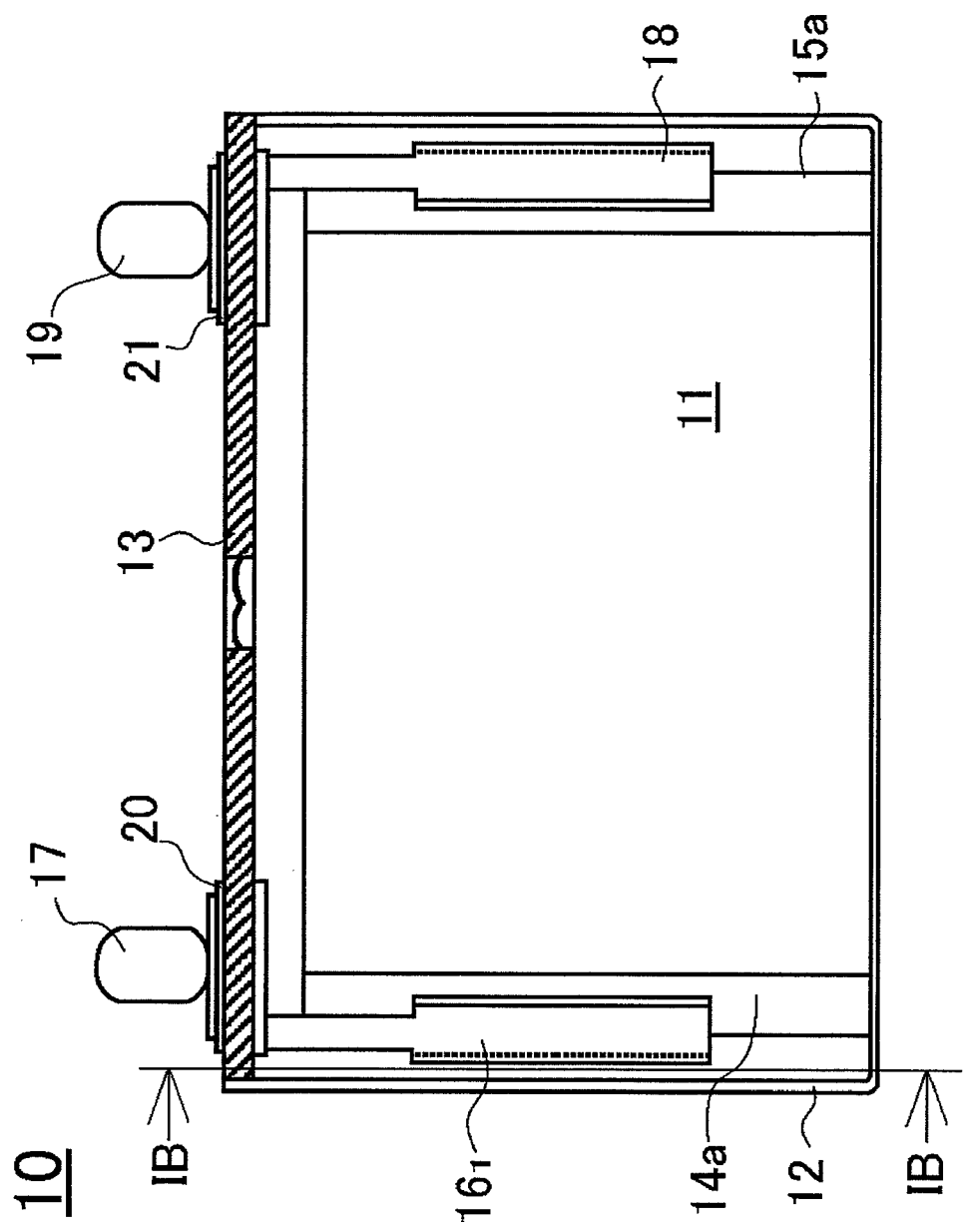
FIG. 1A is a front view illustrating the interior structure of a prismatic nonaqueous electrolyte secondary battery according to an embodiment of the invention.
Figure 2A:
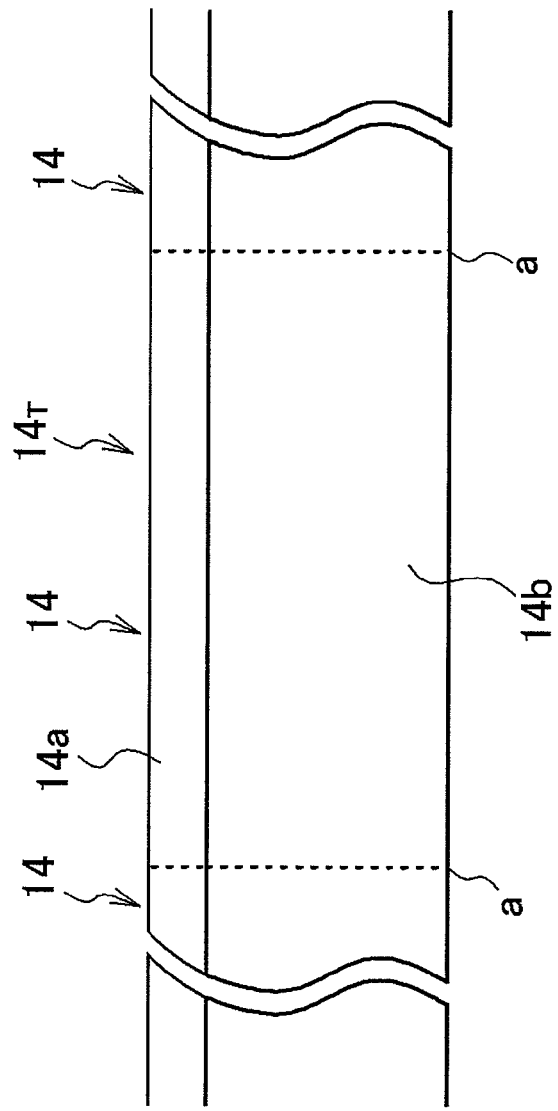
FIG. 2A is a plan view of an electrode sheet.
Figure 2B:
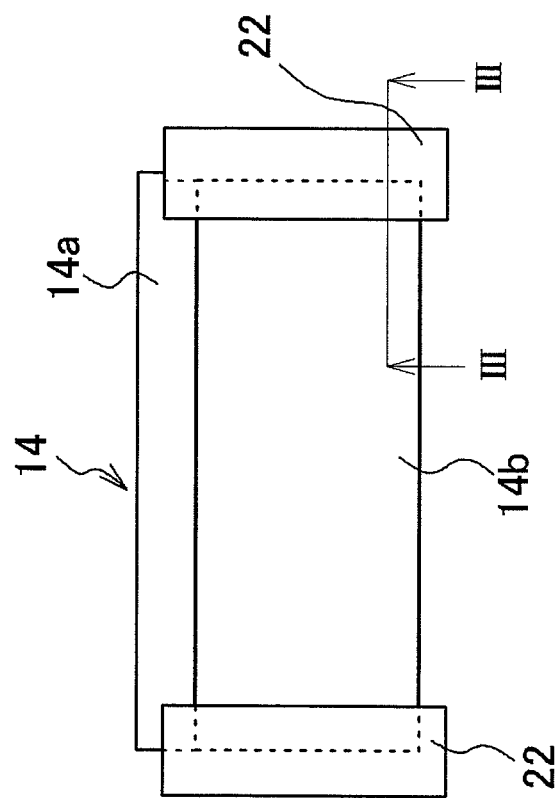
FIG. 2B is a plan view of a positive electrode plate that has been cut out of the electrode sheet in FIG. 2A and has insulating tape affixed to both ends.
Figure 3:
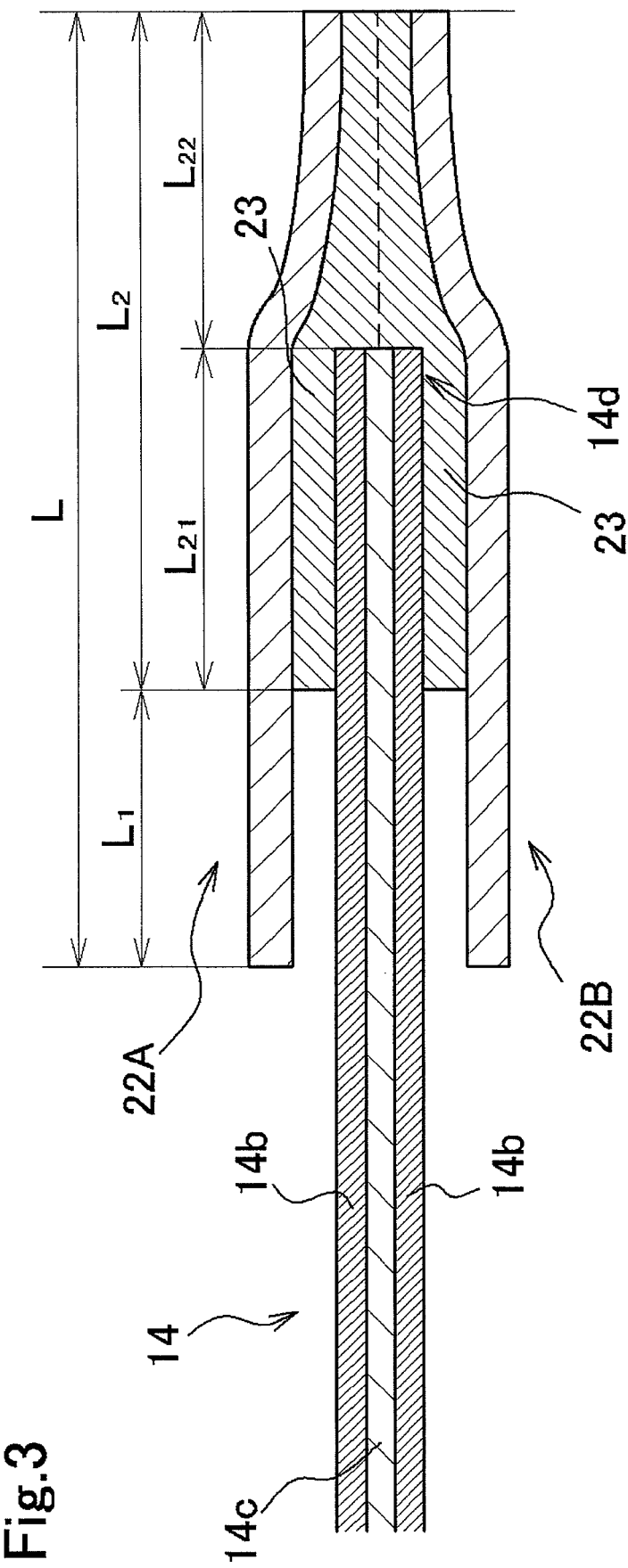
FIG. 3 is a cross-sectional view along line III-III in FIG. 2B.
Figure 4:
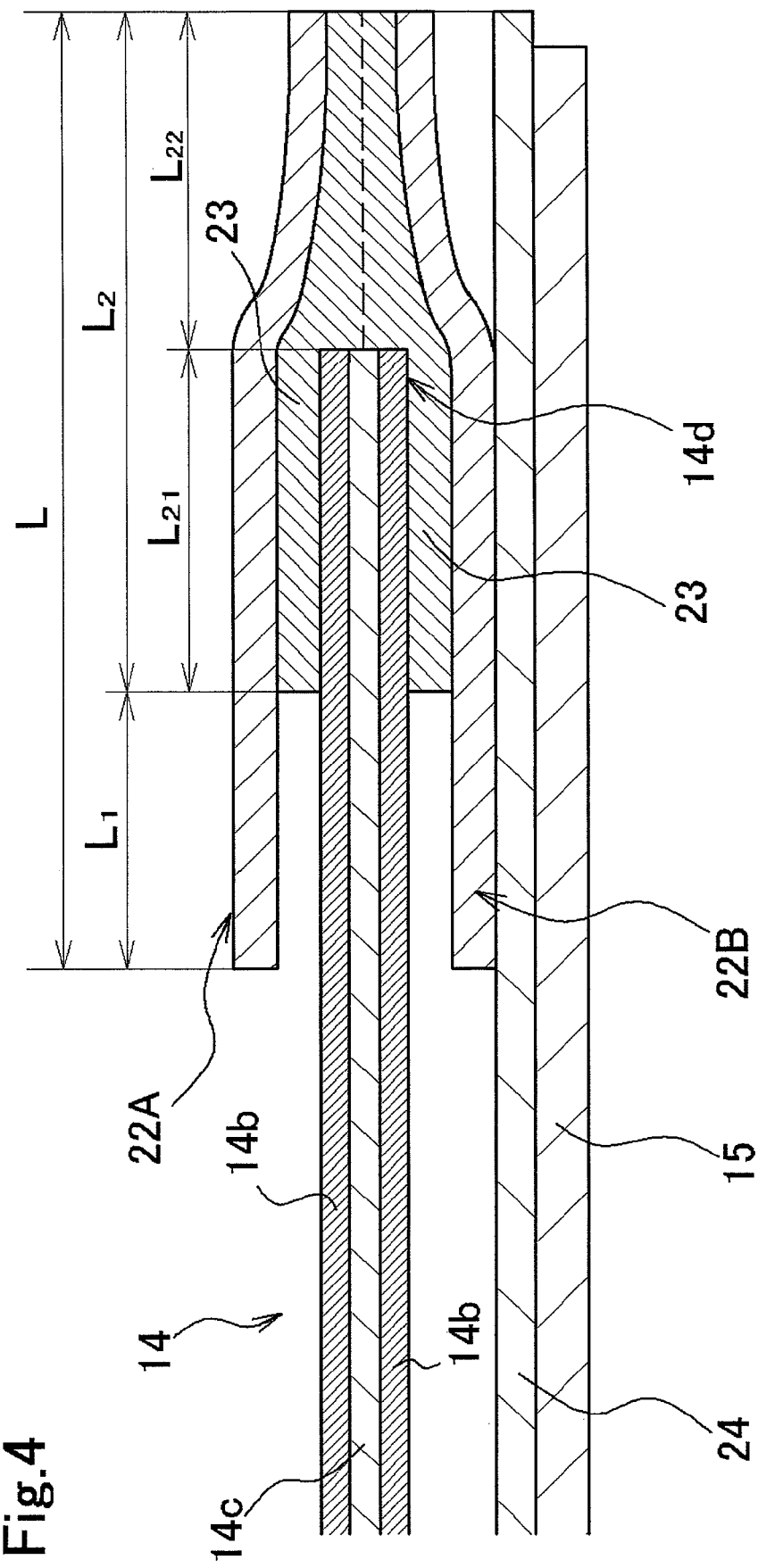
FIG. 4 is a cross-sectional view illustrating schematically the arrangement of a positive electrode plate, a negative electrode plate, and a separator.
Figure 5:
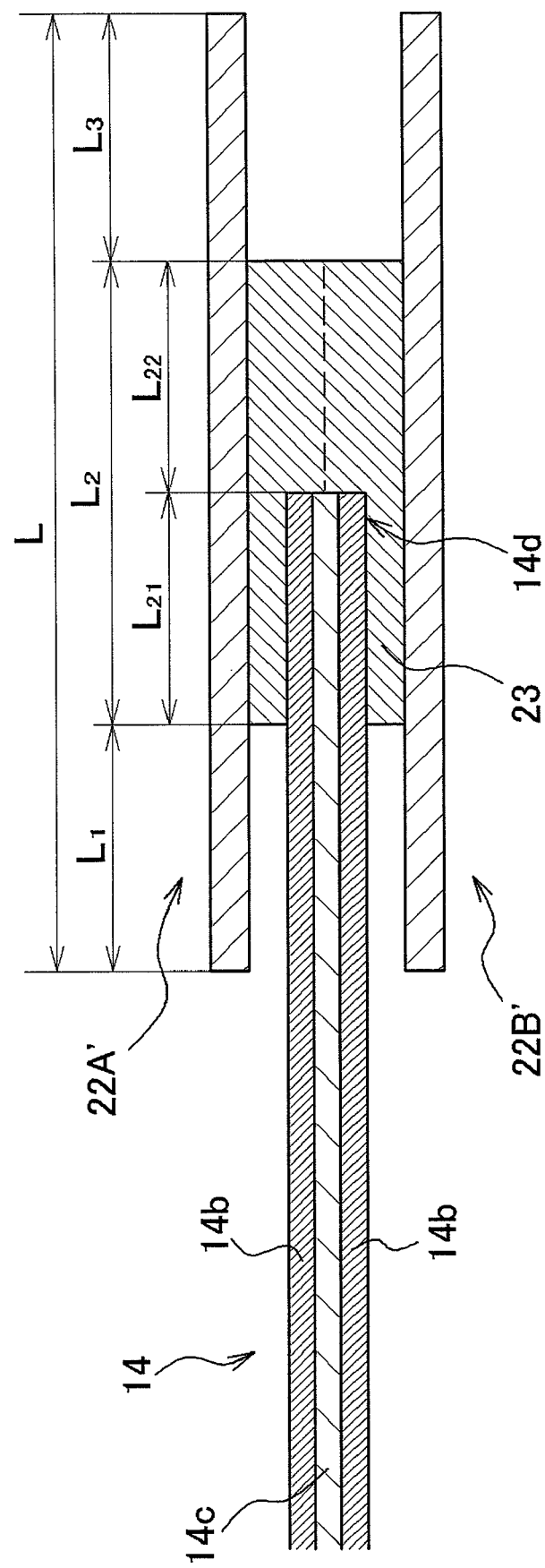
FIG. 5 is an enlarged side view illustrating the end portion of an electrode body of another embodiment, in which different insulating tapes are used.
Figure 6A:
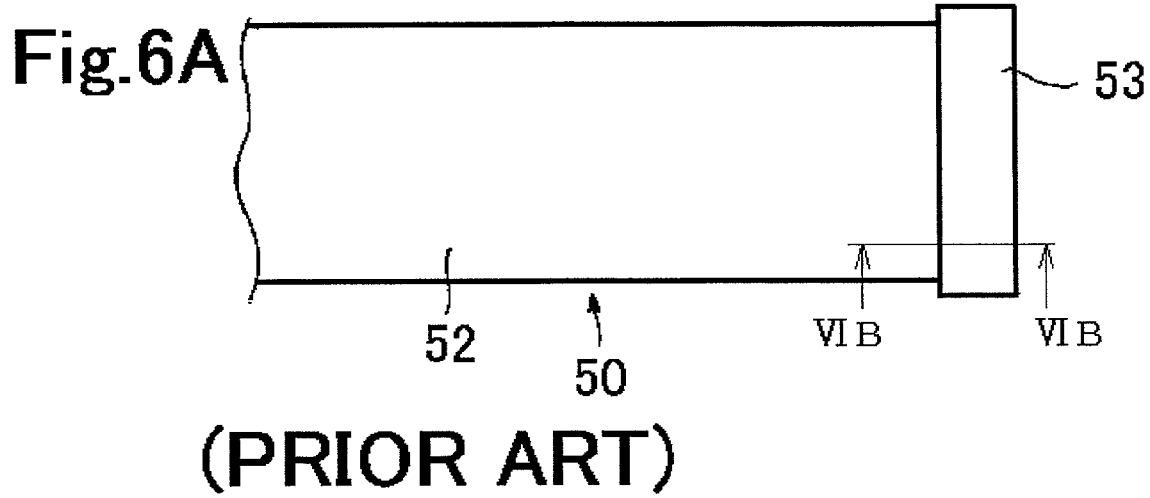
FIG. 6A is a plan view of the electrode material end portion in an example of the related art.
Figure 6B:
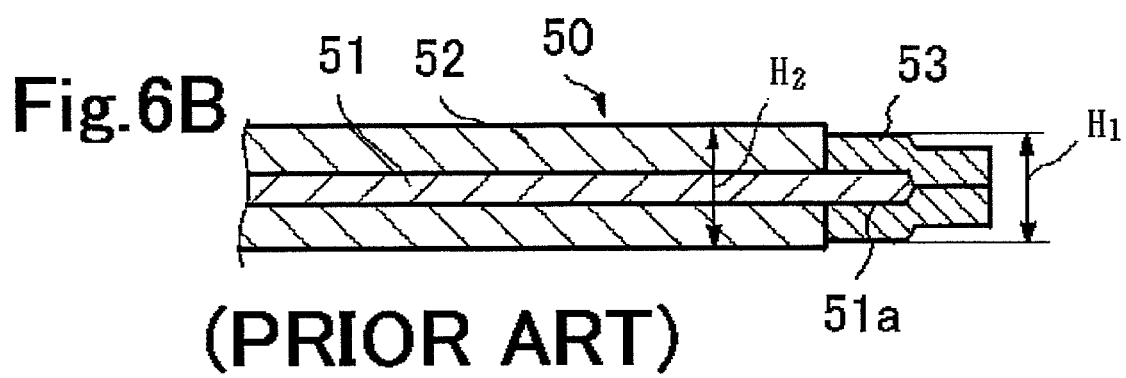
FIG. 6B is a cross-sectional view along line VIB-VIB in FIG. 6A.
Figure 6C:
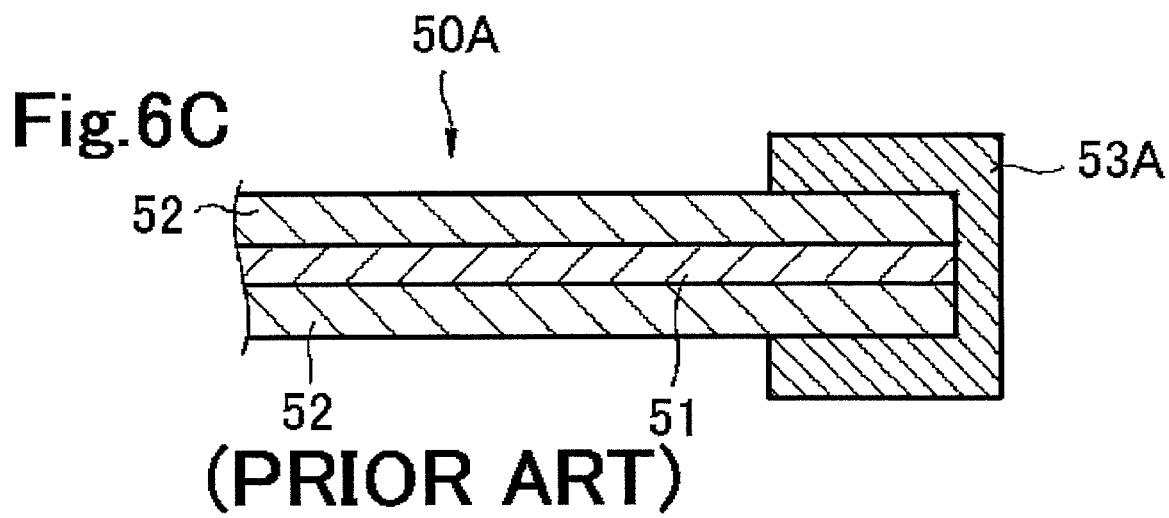
FIG. 6C is a longitudinal cross-sectional view of the electrode material end portion in another example of the related art.
Figure 7A:
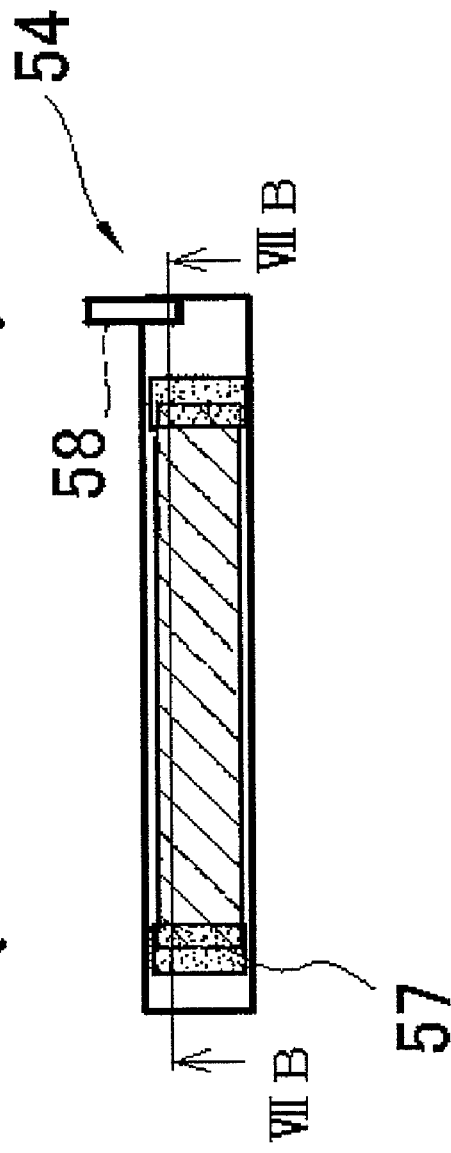
FIG. 7A is a plan view of the electrode plate in a further example of the related art.
Figure 7B:
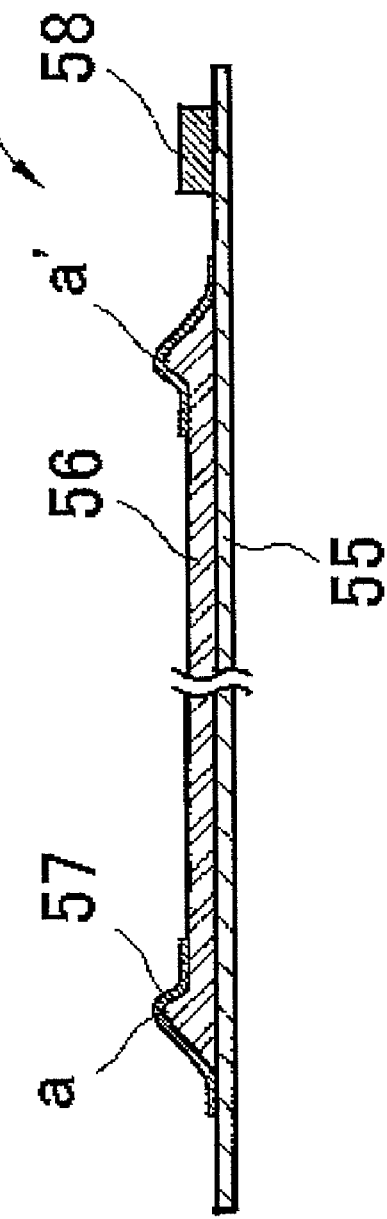
FIG. 7B is a cross-sectional view along line VIIB-VIIB in FIG. 7A.

FIG. 1A is a front view illustrating the interior structure of a prismatic nonaqueous electrolyte secondary battery of according to embodiment of the invention, and FIG. 1B is a cross-sectional view along line IB-IB in FIG. 1A. FIG. 2A is a plan view of an electrode sheet, and FIG. 2B is a plan view of a positive electrode plate that has been cut out of the electrode sheet in FIG. 2A and has insulating tape affixed to both ends. FIG. 3 is a cross-sectional view along line III-III in FIG. 2B. FIG. 4 is a cross-sectional view illustrating schematically the arrangement of a positive electrode plate, a negative electrode plate, and a separator. FIG. 5 is an enlarged side view illustrating the end portion of an electrode body of another embodiment, in which different insulating tapes are used.

First of all, a prismatic nonaqueous electrolyte secondary battery will be described using FIGS. 1 and 2, as an example of a secondary battery according to an embodiment of the invention. A prismatic nonaqueous electrolyte secondary battery 10 has a flattened-form rolled electrode group 11, produced by rolling together positive electrode plates 14 and negative electrode plates 15 with separators (omitted from the drawings) interposed, which is housed in the interior of a prismatic battery case 12, which is sealed by a sealing plate 13.

The flattened-form rolled electrode group 11 has, at one or both end parts in the axial direction of rolling, a positive electrode substrate exposed portion 14a where a positive electrode active material layer 14b is not formed, and a negative electrode substrate exposed portion 15a where a negative electrode active material layer 15b is not formed. The positive electrode substrate exposed portion 14a is connected to a positive electrode terminal 17 via a positive electrode collector $16_1$, and the negative electrode substrate exposed portion 15a is connected to a negative electrode terminal 19 via a negative electrode collector 18. The positive electrode terminal 17 and the negative electrode terminal 19 are fixed to the sealing plate 13 by means of insulating members 20 and 21 respectively.

To fabricate the prismatic nonaqueous electrolyte secondary battery 10, the flattened-form rolled electrode group 11 is inserted into the battery case 12, then the sealing plate 13 is laser welded to the opening of the battery case 12 and nonaqueous electrolyte is poured in through an electrolyte injecting hole (not shown in the drawings), which is then sealed.

Among the positive electrode plate 14 and the negative electrode plate 15, one or both of the cut end portions, in the direction orthogonal to the rolling direction, of the positive electrode plate 14, is/are covered with insulating tape 22, giving a configuration that eliminates sliding-off or migration of the active material, and furthermore suppresses depletion of the electrolyte. The fabrication method for the positive electrode plate 14, and the structure of the insulating tape 22 that is affixed to the positive electrode plate 14, will now be described referring to FIGS. 2 and 3.

The positive electrode plate 14 is fabricated by cutting an elongated positive electrode sheet $14_T$ shown in FIG. 2A into lengths corresponding to individual battery cells. The elongated positive electrode sheet $14_T$ is produced by taking an elongated positive electrode substrate sheet having a predetermined length in the longitudinal direction and a predetermined width in the direction orthogonal to the longitudinal direction, and spreading a mixture containing positive electrode active material onto both the obverse and reverse faces of such positive electrode substrate sheet, to form the positive electrode active material layer 14b. The positive electrode substrate sheet used is made of aluminum, stainless steel, nickel, or titanium, or of an alloy of these, rendered into a thin foil.

At one of the end parts of the positive electrode active material layers 14b in the longitudinal direction, which is the direction of rolling, there is formed the positive electrode substrate exposed portion 14a where a region is provided in which the positive electrode active material layer 14b is not applied and a positive electrode substrate 14c is exposed over the predetermined length. After rolling of the electrode group, these positive electrode substrate exposed portions 14a are gathered into a bundle, to which the positive electrode collector $16_1$, together with a positive electrode collector receiving part $16_2$, is welded (see FIG. 1). For the positive electrode active material layer 14b, for example, a material containing lithium cobalt oxide or the like is used. The positive electrode active material layer 14b is formed using a method in the public domain.

The elongated positive electrode sheet $14_T$ is cut at the dotted lines a in FIG. 2A to fabricate the positive electrode plate 14 for one battery. Because the positive electrode active material layer 14b and the positive electrode substrate 14c are cut at the two end portions of the electrode strip cut out when the elongated positive electrode sheet $14_T$ is cut, burr protrusions occur in the cross-section of the positive electrode substrate 14c, and also, due to the impacts during the cutting, the positive electrode active material layer 14b becomes prone to slide off. Accordingly, protection is implemented by the affixing insulating tape 22 to one or both of the end portions. Two tapes are used for such insulating tape 22, namely insulating tapes 22A and 22B, one for the obverse face and one for the reverse face.

These insulating tapes 22A, 22B are constituted of adhesive tape having adhesive 23 applied to a portion thereof, and both have the same structure. As FIG. 3 shows, the tape used for these insulating tapes 22A, 22B has a predetermined length L in the longitudinal direction and a predetermined width in the direction orthogonal to the longitudinal direction, and on one side has a nonadhesive application area $L_1$ where adhesive has not been applied, and an adhesive application area $L_2$ where adhesive has been applied. The base material used for such tape is polyethylene, polypropylene, polyester, nylon, vinyl chloride, Teflon (registered trademark), polyimide, Kapton (registered trademark), polyphenylene sulphide, or the like. An acrylic, silicon-based or rubber-based adhesive, or the like is used for the adhesive.

These insulating tapes 22A, 22B are, for example, affixed to two end portions 14d of the positive electrode plate 14, as shown in FIG. 2B. As FIG. 3 shows, the insulating tapes 22A, 22B are affixed so that the nonadhesive application area $L_1$ of each is positioned toward the center, away from the end portion 14d, and a portion $L_{21}$ of the adhesive application area $L_2$ is affixed onto the positive electrode active material layer 14b at the end portion 14d, with the remaining portion $L_{22}$ of the adhesive application area $L_2$ of the two tapes 22A, 22B being stuck together. In other words, the nonadhesive application area $L_1$ is positioned at a location biased from the end portion 14$d$ toward the center of the region where the positive electrode active material layer 14$b$ is formed, and the portion $L_{21}$ of the adhesive application area $L_2$ is affixed onto the positive electrode active material layer 14$b$ at the end portion 14$d$. As a result of such affixation, the nonadhesive application area $L_1$ contacts against the surface of the positive electrode active material layer 14$b$, and whereby the positive electrode active material layer 14$b$ is prevented from sliding off. Also, this area $L_1$ is not provided with adhesive and therefore does not absorb electrolyte. Since the nonadhesive application area is provided at that part of the end portion of the insulating tape that is proximate to the separator, absorption by adhesive of the electrolyte inside the separator in the vicinity of the insulating tape end portion can be prevented. Also, in the state where the electrode group has been formed, the area $L_1$, which is the portion of the insulating tape where adhesive has not been applied, is pressed in the direction of the active material layer, with the result that the electrolyte is unlikely to reach the adhesive portion, and hence absorption of the electrolyte by the adhesive is suppressed. Further, the portion $L_{21}$ of the adhesive application area $L_2$ is affixed onto the positive electrode active material layer 14$b$ at the end portion 14$d$, and even if the width of the insulating tapes 22A, 22B is similar to that in the related art, the portion $L_{21}$ of the adhesive application area $L_2$, affixed on the positive electrode active material layer 14$b$, is narrow in comparison to the related art, so that absorption of electrolyte can be kept to a minimum.

The relation between an overall length L of the insulating tape 22 and the length of the adhesive application area $L_2$ is determined so that the length of the adhesive application area $L_2$ is in the range 25 to 95%, more preferably 40 to 60%, of the length L. Determining such length within such range facilitates affixing of the tape, and moreover can effectively prevent the active material from sliding off. The cycle characteristics (suppression of drying-up) too are improved. Also, to effectively prevent the active material layer from sliding off, both $L_{21}$ and $L_{22}$ is preferably 1.5 mm or longer.

The negative electrode plate 15, similarly to the positive electrode plate 14, is fabricated by cutting an elongated negative electrode sheet into lengths corresponding to individual battery cells. Graphite powder, for example, is used for the negative electrode active material. Also, copper foil is used for the negative electrode collector onto which the negative electrode active material is spread.

Insulating tape may alternatively be affixed to the end portions of the negative electrode plate 15, in the same way as with affixing of the insulating tape 22 to the end portions of the positive electrode plate 14. However, it is preferable that the insulating tape 22 be affixed to the positive electrode plate 14. The reason is that the width and length of the negative electrode plate 15 are usually greater than those of the positive electrode plate 14, with the result that the end portion 14$d$ of the positive electrode plate 14 opposes the negative electrode active material layer; therefore there is danger that burr protrusions and sliding-off of the active material at the end portion 14$d$ of the positive electrode plate 14 may result in that plate penetrating through to the other plate. Hence, applying the tape to the end portion 14$d$ of the positive electrode plate 14 is more efficacious.

Using a set of two tapes 22A and 22B having the same structure for the insulating tape 22 facilitates affixation to the end portion 14$d$ of the positive electrode plate 14 and raise mass production efficiency. For example, performing the affixation with a single tape may necessitate the work of folding double and squeezing the tape, rendering the affixation operation troublesome.

Also, if, for the insulating tape 22, use is made of insulating tapes 22A' and 22B' such as in FIG. 5, which are provided with nonadhesive application areas $L_1$ and $L_3$, one at each end portion of the adhesive application area, such tapes is free of directionality and the number of tape types can be halved. More precisely, affixing the two tapes 22A, 22B to both the start edge and the end edge of the electrode plate may mean using four tape types, which is disadvantageous in terms of cost. Whereas if use is made of the insulating tapes 22A' and 22B' provided with the nonadhesive application areas $L_1$ and $L_3$, one at each end portion of the adhesive application area, such tapes is free of directionality, and so affixation is possible with just two tape types stuck together one over the other, whether at the electrode plate start edge or finish edge.

If use is made of the insulating tapes 22A' and 22B' such as shown in FIG. 5, provided with the nonadhesive application areas $L_1$ and $L_3$, one at each end portion of the adhesive application area, then it is preferable that the length of the adhesive application area $L_2$, as a proportion of the total length of the adhesive application area $L_2$ and the nonadhesive application area $L_1$ that is positioned centrally on the active material layer, be determined in the range 25 to 95%, more preferably 40 to 60%. Determining such length within such range facilitates affixing of the tape, and moreover can effectively prevent the active material from sliding off. The cycle characteristics (suppression of drying-up) too are improved. Also, to effectively prevent the active material from sliding off, both of the $L_{21}$ and $L_{22}$ is preferably 1.5 mm or longer.

For a separator 24, an insulating microporous membrane having a particular mechanical strength, for example, a microporous membrane made of polyethylene, is used. For the electrolyte, 1 mol/L of $LiPF_6$, as the electrolytic substance, dissolved in an organic solvent constituted of, for example, ethylene carbonate (EC), methyl ethyl carbonate (MEC) and dimethyl carbonate (DMC) in the proportion 30:30:40, is used.

The procedure for fabricating the prismatic nonaqueous electrolyte secondary battery 10 will now be described. First of all, the insulating tape 22 is affixed to the positive electrode plates 14, and the separators 24 are interposed between the positive electrode plates 14 and the negative electrode plates 15, to form the flattened-form rolled electrode group 11. Then the positive electrode substrate exposed portions 14$a$ of the positive electrode plates 14 and the negative electrode substrate exposed portions 15$a$ of the negative electrode plates 15 are displaced so as not to be superposed over the active material layer of the opposing electrode, and the electrode plates are rolled up with the porous polyethylene separators interposed, making a flattened-form rolled electrode group 11 with a plurality of positive electrode substrate exposed portions 14$a$ and a plurality of negative electrode substrate exposed portions 15$a$ formed at both ends. Next, the positive electrode substrate exposed portions 14$a$ on the flattened-form rolled electrode group 11 are bundled together, the positive electrode collector $16_1$ and the positive electrode collector receiving part $16_2$, are each brought into contact with one of the two sides of the positive electrode substrate exposed portion 14$a$ bundle, and the positive electrode collector $16_1$ is welded to the positive electrode substrate exposed portion 14$a$. Likewise, the negative electrode collector 18 is welded to the negative electrode substrate exposed portion 15$a$ bundle on the negative electrode 15.

Following that, the positive electrode collector $16_1$ is welded to the positive electrode terminal 17 formed on the sealing plate 13, and the negative electrode collector 18 is welded to the negative electrode terminal 19 formed on the sealing plate 13. Then the rolled electrode group 11 is inserted into the battery case 12, the sealing plate 13 is fitted to the opening of the battery case 12, and the sealing plate 13 and the battery case 12 are welded together by, for example, laser welding. After that, electrolyte is poured from the electrolyte injecting hole (not shown in the drawings) in the sealing plate 13 into the battery case 12. Then the electrolyte injecting hole is sealed, whereupon the prismatic nonaqueous electrolyte secondary battery 10 is complete.

In the rolled electrode group 11 thus configured, the nonadhesive application area $L_1$ of the insulating tape 22 is positioned away from the end portion 14$d$, at a location biased toward the region where the positive electrode active material layer 14$b$ is formed, and the portion $L_{21}$ of the adhesive application area $L_2$ is affixed onto the positive electrode active material layer 14$b$ at the end portion 14$d$ of the positive electrode plate 14. As a result of such affixation of the insulating tape 22, the nonadhesive application area $L_1$ contacts against the surface of the positive electrode active material layer 14$b$, and whereby the positive electrode active material layer 14$b$ is prevented from sliding off. Also, this nonadhesive application area $L_1$ is not provided with adhesive and therefore does not absorb electrolyte. Further, because only the portion $L_{21}$ of the adhesive application area $L_2$ is affixed onto the positive electrode active material layer 14$b$ at the end portion 14$d$ of the positive electrode plate 14, the affixed area is narrow in comparison to the related art, so that absorption of electrolyte can be kept to a minimum.

Examples 1, 2 and Comparative Example

The positive electrode plates 14 for use in Examples 1 and 2 and in Comparative Example were fabricated by applying the positive electrode active material layer 14$b$ onto both faces of the positive electrode substrate 14$c$ made of aluminum foil, drying and rolling out the resulting item, then slitting such item so as to form a strip-like positive electrode substrate exposed portion 14$a$ at one of the widthwise edge portions thereof. Likewise, the negative electrode plates 15 for use in Examples and in Comparative Example were fabricated by applying a negative electrode active material layer onto both faces of a negative electrode substrate made of copper foil, drying and rolling out the resulting item, then slitting such item so as to form the strip-like negative electrode substrate exposed portion 15$a$ at one of the widthwise edge portions thereof.

The insulating tapes 22A and 22B were then affixed to the two faces of the positive electrode plates 14 for Examples 1 and 2, to produce the arrangement shown in FIG. 3. In the positive electrode plate 14 for Example 1, the adhesive application area length $L_2$ was 4 mm and the nonadhesive application area length $L_1$ was 3 mm, with the length $L_{21}$ of the adhesive application portion positioned on the positive electrode active material, and the length $L_{22}$ of the adhesive application portion not positioned on the positive electrode active material, each being 2 mm. In the positive electrode plate 14 for Example 2, the adhesive application area length $L_2$ was 8 mm and the nonadhesive application area length $L_1$ was 7 mm, with the length $L_{21}$ of the adhesive application portion positioned on the positive electrode active material, and the length $L_{22}$ of the adhesive application portion not positioned on the positive electrode active material, each being 4 mm. Also, for the positive electrode plate of Comparative Example, the adhesive application area length was 7 mm, with the length $L_{21}$ of the adhesive application portion positioned on the positive electrode active material, and the length $L_{22}$ of the adhesive application portion not positioned on the positive electrode active material, each being 3.5 mm, and there was no nonadhesive application area length.

Prismatic nonaqueous electrolyte secondary batteries for Examples 1, 2 and Comparative Example were fabricated using the positive electrode plates prepared for each in the foregoing manner. The high temperature storage test below was then conducted using these prismatic nonaqueous electrolyte secondary batteries. The results are compiled in Table 1.

In the high temperature storage test, the prismatic nonaqueous electrolyte secondary batteries for Examples 1, 2 and comparative Example were stored, in the initial phase of the charge-discharge cycle, for 23 days at 70° C., and after the end of such storage period, the nonaqueous electrolyte secondary batteries were dismantled and the degree of depletion of the electrolyte was determined by visually examining the degree of discoloration of the separators. The results are compiled in Table 1. In a separate investigation of the cycle characteristics of the prismatic nonaqueous electrolyte secondary batteries for Examples 1 and 2, and of a prismatic nonaqueous electrolyte secondary battery that used electrode plates without insulating tape affixed, it was found that the prismatic nonaqueous electrolyte secondary batteries for Examples 1 and 2 exhibited cycle characteristics comparable to those of the prismatic nonaqueous electrolyte secondary battery that used electrode plates without insulating tape affixed. Hence it may be assumed that the cycle characteristics is not impaired when insulating tape is affixed according to the method of the invention.

TABLE 1

|  | Adhesive application area length $L_2$ | Nonadhesive application area length $L_1$ | Adhesive application portion length $L_{21}$ positioned on active material | Adhesive application portion length $L_{22}$ not positioned on active material | Separator electrolyte depletion |
|---|---|---|---|---|---|
| Example 1 | 4 mm | 3 mm | 2 mm | 2 mm | Small |
| Example 2 | 8 mm | 7 mm | 4 mm | 4 mm | Small |
| Comparative Example | 7 mm | 0 mm | 3.5 mm | 3.5 mm | Large |

The results set forth in Table 1 confirmed that with nonaqueous electrolyte secondary batteries of the invention, in which an area on the active material layer is left uncoated with adhesive, the amount of electrolyte that is absorbed is reduced in comparison to the battery in Comparative Example, in which adhesive is applied over the entire surface of the active material layer. It should be noted that although Examples illustrate the case where a rolled electrode group is used, which is produced by rolling together positive and negative electrode plates alternately, with separators interposed, into a flattened form, a secondary battery of the invention produces similar effects and advantages in the case where the electrode group is a stack type electrode group in which the positive and negative electrode plates are stacked alternately over one another with separators interposed, as well as in the case of a rolled electrode group that is of a cylindrical or an ellipsoidal shape.

What is claimed is:

1. A secondary battery comprising:
    a positive electrode plate with a positive electrode active material layer formed on a surface of a positive electrode collector,
    a negative electrode plate with a negative electrode active material layer formed on a surface of a negative electrode collector,
    a separator that is interposed between the positive electrode plate and the negative electrode plate, and
    insulating tape that is affixed to a cut end portion, including an active material layer portion, of either the positive electrode plate, or the negative electrode plates, or both;
    the positive electrode plate, the negative electrode plate, and the separator being stacked or rolled alternately into an electrode group that is sealed, together with electrolyte, inside a battery case,
    the insulating tape being constituted of adhesive insulating tape that has an adhesive application area where adhesive has been applied and a nonadhesive application area where adhesive has not been applied, and
    the insulating tape being affixed so that the nonadhesive application area is positioned centrally on the active material layer of the electrode plate to which the insulating tape is affixed, and moreover so that a part of the adhesive application area is positioned on the active material layer at the cut end portion side.

2. The secondary battery according to claim 1, wherein the active material layer is formed on both obverse and reverse faces of the positive electrode plate and negative electrode plate, and the insulating tape is affixed on both faces of the cut end portion side, including the cut end portion.

3. The secondary battery according to claim 1, wherein the insulating tape has at both ends a nonadhesive application area where adhesive is not applied, and between such nonadhesive application areas, an adhesive application area where adhesive is applied is provided.

4. The secondary battery according to claim 1, wherein a length of the adhesive application areas constitutes 25 to 95% of a total length of the adhesive application areas and the nonadhesive application area that is positioned centrally on the active material layer, a length of the adhesive application area portion positioned on the active material layer at the cut end portions is 1.5 mm or higher, and a length of the adhesive application area portion not positioned on the active material layer at the cut end portions is 1.5 mm or higher.

5. The secondary battery according to claim 1, wherein the insulating tape is affixed along a cut end portion of the electrode plate.

6. The secondary battery according to claim 1, wherein the insulating tape protrudes outside from the cut end portion of the electrode plate.

7. The secondary battery according to claim 6, wherein the insulating tape is affixed on both faces of the cut end portion side of the electrode plate, and has opposing areas where the electrode plate is interposed and an opposing area where the electrode plate is not interposed.

8. The secondary battery according to claim 7, wherein the insulating tape opposing areas that are opposed without an interposed electrode plate are adhered to each other.

9. The secondary battery according to claim 5, wherein the active material layer is formed on both obverse and reverse faces of the positive electrode plate and negative electrode plate, and the insulating tape is affixed on both faces of the cut end portion side, including the cut end portion.

10. The secondary battery according to claim 5, wherein the insulating tape has at both ends a nonadhesive application area where adhesive is not applied, and between such nonadhesive application areas, an adhesive application area where adhesive is applied is provided.

11. The secondary battery according to claim 5, wherein a length of the adhesive application areas constitutes 25 to 95% of a total length of the adhesive application areas and the nonadhesive application area that is positioned centrally on the active material layer, a length of the adhesive application area portion positioned on the active material layer at the cut end portions is 1.5 mm or higher, and a length of the adhesive application area portion not positioned on the active material layer at the cut end portions is 1.5 mm or higher.

12. The secondary battery according to claim 6, wherein the active material layer is formed on both obverse and reverse faces of the positive electrode plate and negative electrode plate, and the insulating tape is affixed on both faces of the cut end portion side, including the cut end portion.

13. The secondary battery according to claim 6, wherein the insulating tape has at both ends a nonadhesive application area where adhesive is not applied, and between such nonadhesive application areas, an adhesive application area where adhesive is applied is provided.

14. The secondary battery according to claim 6, wherein a length of the adhesive application areas constitutes 25 to 95% of a total length of the adhesive application areas and the nonadhesive application area that is positioned centrally on the active material layer, a length of the adhesive application area portion positioned on the active material layer at the cut end portions is 1.5 mm or higher, and a length of the adhesive application area portion not positioned on the active material layer at the cut end portions is 1.5 mm or higher.

15. The secondary battery according to claim 7, wherein the insulating tape has at both ends a nonadhesive application area where adhesive is not applied, and between such nonadhesive application areas, an adhesive application area where adhesive is applied is provided.

16. The secondary battery according to claim 7, wherein a length of the adhesive application areas constitutes 25 to 95% of a total length of the adhesive application areas and the nonadhesive application area that is positioned centrally on the active material layer, a length of the adhesive application area portion positioned on the active material layer at the cut end portions is 1.5 mm or higher, and a length of the adhesive application area portion not positioned on the active material layer at the cut end portions is 1.5 mm or higher.

17. The secondary battery according to claim 8, wherein the insulating tape has at both ends a nonadhesive application area where adhesive is not applied, and between such nonadhesive application areas, an adhesive application area where adhesive is applied is provided.

18. The secondary battery according to claim 8, wherein a length of the adhesive application areas constitutes 25 to 95% of a total length of the adhesive application areas and the nonadhesive application area that is positioned centrally on the active material layer, a length of the adhesive application area portion positioned on the active material layer at the cut end portions is 1.5 mm or higher, and a length of the adhesive application area portion not positioned on the active material layer at the cut end portions is 1.5 mm or higher.

* * * * *